US012131569B2

(12) United States Patent
Yamazaki

(10) Patent No.: US 12,131,569 B2
(45) Date of Patent: Oct. 29, 2024

(54) APPARATUS, METHOD, AND COMPUTER PROGRAM FOR HUMAN DETECTION

(71) Applicant: TOYOTA JIDOSHA KABUSHIKI KAISHA, Toyota (JP)

(72) Inventor: Masayuki Yamazaki, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 350 days.

(21) Appl. No.: 17/726,886

(22) Filed: Apr. 22, 2022

(65) Prior Publication Data

US 2022/0343667 A1    Oct. 27, 2022

(30) Foreign Application Priority Data

Apr. 26, 2021    (JP) .................................. 2021-074272

(51) Int. Cl.
*G06V 40/10*    (2022.01)
*G06T 7/20*    (2017.01)

(52) U.S. Cl.
CPC .............. *G06V 40/103* (2022.01); *G06T 7/20* (2013.01); *G06T 2207/30196* (2013.01); *G06T 2207/30242* (2013.01)

(58) Field of Classification Search
CPC ................... G06V 40/103; G06T 7/20; G06T 2207/30196; G06T 2207/30242
See application file for complete search history.

(56) References Cited

U.S. PATENT DOCUMENTS

| 8,229,164 | B2 * | 7/2012 | Miyamoto | G06V 40/103 |
| | | | | 382/103 |
| 8,675,954 | B2 * | 3/2014 | Nakayama | G06T 7/77 |
| | | | | 382/154 |
| 9,020,210 | B2 * | 4/2015 | Hasegawa | G06F 16/583 |
| | | | | 382/118 |
| 9,355,305 | B2 * | 5/2016 | Tanabiki | G06V 40/23 |
| 10,416,943 | B2 * | 9/2019 | Maeshima | G06F 3/1221 |
| 10,445,566 | B2 * | 10/2019 | Sashida | G06V 40/168 |

(Continued)

FOREIGN PATENT DOCUMENTS

| JP | 2014-535108 A | 12/2014 |
| JP | 2015-222881 A | 12/2015 |

(Continued)

*Primary Examiner* — Gregory M Desire
(74) *Attorney, Agent, or Firm* — Sughrue Mion, PLLC

(57) ABSTRACT

An apparatus for human detection includes a processor configured to detect human regions from an image, integrate two or more human regions overlapping more than a predetermined degree into a single integrated human region among the detected human regions, input the integrated human region into a skeleton detector to determine a skeleton of an undetermined and foremost person out of one or more persons included in the integrated human region, mask a region representing the detected foremost person in the integrated human region based on the skeleton of the foremost person to modify the integrated human region, repeat detection of a skeleton and masking of a region representing a person in the modified integrated human region until a human skeleton is no longer detected, and determine the number of skeletons detected from the integrated human region as the number of persons represented in the integrated human region.

6 Claims, 7 Drawing Sheets

(56) References Cited

U.S. PATENT DOCUMENTS

| | | | |
|---|---|---|---|
| 10,713,507 B2 * | 7/2020 | Noda | G08G 1/166 |
| 11,263,443 B2 * | 3/2022 | Brookshire | G06V 20/64 |
| 11,354,531 B2 * | 6/2022 | Barua | G06F 18/2415 |
| 11,514,703 B2 * | 11/2022 | Oya | G06V 20/52 |
| 2013/0108122 A1 | 5/2013 | Ptucha | |
| 2014/0072170 A1 | 3/2014 | Zhang et al. | |
| 2015/0339519 A1 | 11/2015 | Ueta et al. | |
| 2016/0140399 A1 | 5/2016 | Yano et al. | |

FOREIGN PATENT DOCUMENTS

| | | |
|---|---|---|
| JP | 2016-095808 A | 5/2016 |
| JP | 2018-022340 A | 2/2018 |
| JP | 6424163 B2 | 11/2018 |
| JP | 2020-098474 A | 6/2020 |

\* cited by examiner

APPARATUS, METHOD, AND COMPUTER PROGRAM FOR HUMAN DETECTION

FIELD

The present invention relates to an apparatus, a method, and a computer program for detecting a human represented in an image.

BACKGROUND

Techniques for detecting a human represented in an image obtained by a camera have been researched (see Japanese Unexamined Patent Publications JP2020-98474A, JP2018-22340A, JP2016-95808A, and JP2015-222881A).

A device for determining attributes disclosed in JP2020-98474A detects the positions of control points that define a human skeleton from an image of a person taken from above, and recognizes his/her attribute from the result of detection.

An image processor disclosed in JP2018-22340A executes a process for detecting specific objects on a first region in an image to estimate the number of specific objects in the first region. The image processor further executes a regression process, which is a process for estimating the number of specific objects for each predetermined region, on a second region in the image to estimate the number of specific objects in the second region. The image processor then integrates the results of estimation.

A human detector disclosed in JP2016-95808A identifies whether sub-regions extracted from an image include a predetermined object, and determines whether to integrate the results of identification of overlapping sub-regions identified as those including a predetermined object, based on the distances in the depth direction of the sub-regions.

A monitoring device disclosed in JP2015-222881A detects a human from captured moving images to obtain positional information on a human region, and determines its regional state, which indicates the state of the person in the human region, based on the positional information. The monitoring device then sets a mask image corresponding to the regional state, and generates and outputs moving images in which the human region is changed to the mask image corresponding to the regional state. Additionally, the monitoring device obtains positional information on each person in each frame, and, when it fails to detect a human in a frame where persons overlap, obtains the positional information regarding this frame from the positional information obtained in immediately preceding frames.

SUMMARY

These techniques may fail to detect individual persons to be detected when they are represented on top of another in an image.

It is an object of the present invention to provide an apparatus for human detection that can detect individual persons even if they overlap in an image.

According to an embodiment, an apparatus for human detection is provided. The apparatus includes a processor configured to: detect human regions representing a human from an image generated by a camera, set a single integrated human region by selecting one of two or more human regions whose degree of overlap is not less than a predetermined threshold among the detected human regions or by defining a region including the two or more human regions, input the integrated human region into a skeleton detector to detect a skeleton of an undetermined and foremost person out of one or more persons included in the integrated human region, the skeleton detector having been trained to detect a human skeleton, mask a region representing the foremost person in the integrated human region based on the skeleton of the foremost person to modify the integrated human region, repeat detection of a skeleton and masking of a region representing a person in the modified integrated human region until a human skeleton is no longer detected, and determine the number of skeletons detected from the integrated human region as the number of persons represented in the integrated human region.

In the apparatus, the processor is preferably further configured to track persons detected from each of time-series past images generated by the camera earlier than the image to determine an estimated overlap region in the image assumed to represent two or more persons. In this case, when the two or more human regions whose degree of overlap is not less than the threshold are outside the estimated overlap region, the processor preferably determines that the two or more human regions represent the same person.

Additionally, when the two or more human regions whose degree of overlap is not less than the threshold are outside the estimated overlap region, the processor preferably selects one of the two or more human regions and deletes the other human regions. When the two or more human regions whose degree of overlap is not less than the threshold are inside the estimated overlap region, the processor preferably sets the integrated human region so as to include the union of the two or more human regions therein.

In addition, in the apparatus, the processor is preferably further configured to track persons detected from each of time-series past images generated by the camera earlier than the image to determine an estimated overlap region in the image assumed to represent two or more persons. In this case, the processor preferably sets the threshold for the case that the two or more human regions are inside the estimated overlap region lower than the threshold for the case that the two or more human regions are outside the estimated overlap region.

According to another embodiment, a method for human detection is provided. The method includes detecting human regions representing a human from an image generated by a camera, setting a single integrated human region by selecting one of two or more human regions whose degree of overlap is not less than a predetermined threshold among the detected human regions or by defining a region including the two or more human regions, and inputting the integrated human region into a skeleton detector to detect a skeleton of an undetermined and foremost person out of one or more persons included in the integrated human region, the skeleton detector having been trained to detect a human skeleton, masking a region representing the foremost person in the integrated human region based on the skeleton of the foremost person to modify the integrated human region; repeating detection of a skeleton and masking of a region representing a person in the modified integrated human region until a human skeleton is no longer detected; and determining the number of skeletons detected from the integrated human region as the number of persons represented in the integrated human region.

According to still another embodiment, a non-transitory recording medium that stores a computer program for human detection is provided. The computer program includes instructions causing a computer to execute a process including detecting human regions representing a human from an image generated by a camera, setting a single integrated human region by selecting one of two or more human regions whose degree of overlap is not less than a predetermined threshold among the detected human regions or by defining a region including the two or more human regions, and inputting the integrated human region into a skeleton detector to detect a skeleton of an undetermined and foremost person out of one or more persons included in the integrated human region, the skeleton detector having been trained to detect a human skeleton, masking a region representing the foremost person in the integrated human region based on the skeleton of the foremost person to modify the integrated human region; repeating detection of a skeleton and masking of a region representing a person in the modified integrated human region until a human skeleton is no longer detected; and determining the number of skeletons detected from the integrated human region as the number of persons represented in the integrated human region.

The apparatus according to the present invention has an advantageous effect of being able to detect individual persons even if they overlap in an image.

DESCRIPTION OF EMBODIMENTS

An apparatus for human detection as well as a method and a computer program therefor executed by the apparatus will now be described with reference to the attached drawings. The apparatus inputs an image into a classifier that has been trained to detect a human represented in an image, thereby detecting a region including a human (hereafter, a "human region") in the image. When two or more human regions overlapping more than a predetermined degree are detected, the apparatus integrates these human regions into a single integrated human region. The apparatus then inputs the integrated human region into a skeleton detector that has been trained to detect a human skeleton, thereby determining a skeleton of an undetermined and foremost person out of one or more persons included in the integrated human region. Additionally, the apparatus masks pixels representing the foremost person in the integrated human region, based on the skeleton of the foremost person, and inputs the masked integrated human region into the skeleton detector again. After that, the apparatus repeats the skeleton detection process and the masking process until a human skeleton is no longer detected from the integrated human region. This enables the apparatus to detect individual persons even if they overlap in the image.

The following describes an example in which the apparatus is applied to a vehicle control system. In this example, the apparatus executes a human detection process on time-series images obtained by a camera mounted on a vehicle to detect detection targets around the vehicle. The detection targets include objects that affect travel of the vehicle 10, such as other traveling vehicles around the vehicle 10, humans, signposts, traffic lights, road markings including lane-dividing lines, and other objects on roads.

Figure 1:
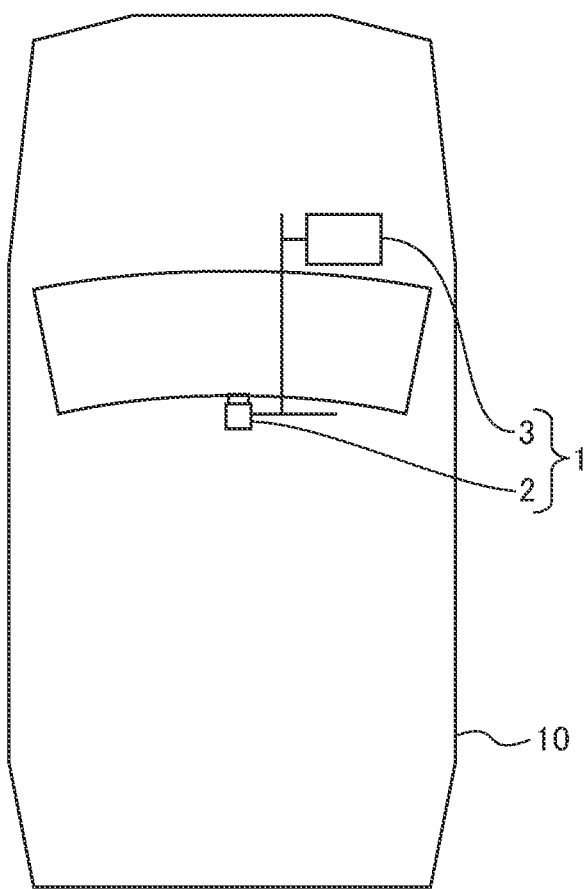
FIG. 1 schematically illustrates the configuration of a vehicle control system equipped with an apparatus for human detection.
Figure 2:
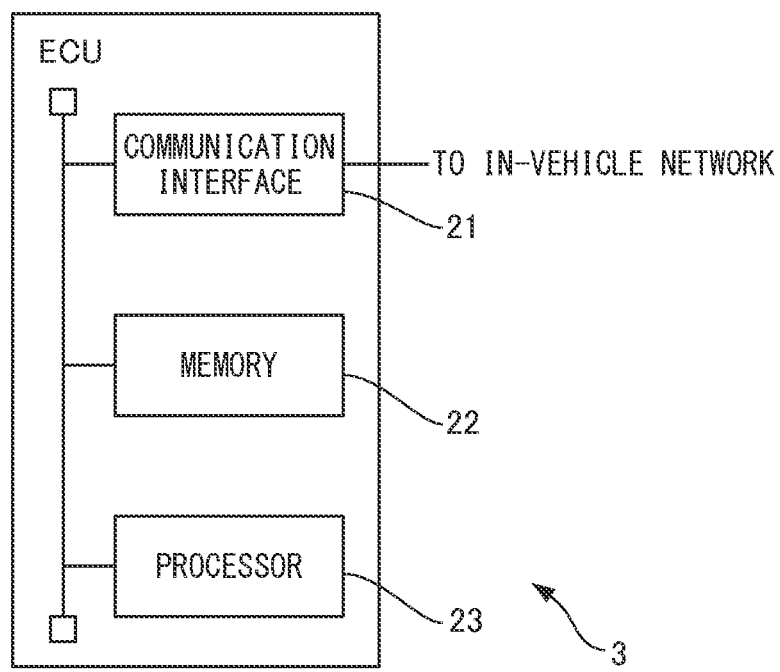
FIG. 2 illustrates the hardware configuration of an electronic control unit, which is an embodiment of the apparatus for human detection.

FIG. 1 schematically illustrates the configuration of a vehicle control system equipped with the apparatus for human detection. FIG. 2 illustrates the hardware configuration of an electronic control unit, which is an embodiment of the apparatus for human detection. In the present embodiment, a vehicle control system 1, which is mounted on a vehicle 10 and controls the vehicle 10, includes a camera 2 for capturing the surroundings of the vehicle 10 and an electronic control unit (ECU) 3, which is an example of the apparatus for human detection. The camera 2 is connected to the ECU 3 via an in-vehicle network conforming to a standard, such as a controller area network, so that they can communicate with each other. The vehicle control system 1 may further include a storage device storing map information that represents lane-dividing lines and the positions and types of road features and that is used for autonomous driving control of the vehicle 10. The vehicle control system 1 may further include a range sensor, such as LiDAR or radar; a GPS receiver or another receiver for determining the position of the vehicle 10 in conformity with a satellite positioning system; a wireless terminal for wireless communication with another device; and a navigation device for searching for a planned travel route of the vehicle 10.

The camera 2, which is an example of the image capturing unit, includes a two-dimensional detector constructed from an array of optoelectronic transducers, such as CCD or C-MOS, having sensitivity to visible light and a focusing optical system that forms an image of a target region on the two-dimensional detector. The camera 2 is mounted, for example, in the interior of the vehicle 10 so as to be oriented to the front of the vehicle 10. The camera 2 captures a region in front of the vehicle 10 every predetermined capturing period (e.g., 1/30 to 1/10 seconds), and generates images representing this region. The images obtained by the camera 2 are preferably color images. The vehicle 10 may include multiple cameras taking pictures in different orientations or having different focal lengths.

Whenever generating an image, the camera 2 outputs the generated image to the ECU 3 via the in-vehicle network.

The ECU 3 controls the vehicle 10. In the present embodiment, the ECU 3 controls the vehicle 10 to automatically drive it, based on objects detected from time-series images obtained by the camera 2. To achieve this, the ECU 3 includes a communication interface 21, a memory 22, and a processor 23.

The communication interface 21, which is an example of a communication unit, includes an interface circuit for connecting the ECU 3 to the in-vehicle network. In other words, the communication interface 21 is connected to the camera 2 via the in-vehicle network. Whenever receiving an image from the camera 2, the communication interface 21 passes the received image to the processor 23.

The memory 22, which is an example of a storage unit, includes, for example, volatile and nonvolatile semiconductor memories. The memory 22 stores various types of data and various parameters used in a vehicle control process, which includes a human detection process, executed by the processor 23 of the ECU 3. Specifically, the memory 22 stores, for example, images received from the camera 2, various parameters for defining a classifier used in the human detection process, various parameters for defining the skeleton detector, and an overlap threshold for determining integration of human regions. The memory 22 also stores various types of data generated in the vehicle control process for a certain period. The memory 22 may further store information used for travel control of the vehicle 10, such as map information.

The processor 23, which is an example of a control unit, includes one or more central processing units (CPUs) and a peripheral circuit thereof. The processor 23 may further include another operating circuit, such as a logic-arithmetic unit, an arithmetic unit, or a graphics processing unit (GPU). Whenever receiving an image from the camera 2 during travel of the vehicle 10, the processor 23 executes the vehicle control process including the human detection process on the received image. The processor 23 then controls the vehicle 10 to automatically drive it, based on detected objects around the vehicle 10.

Figure 3:
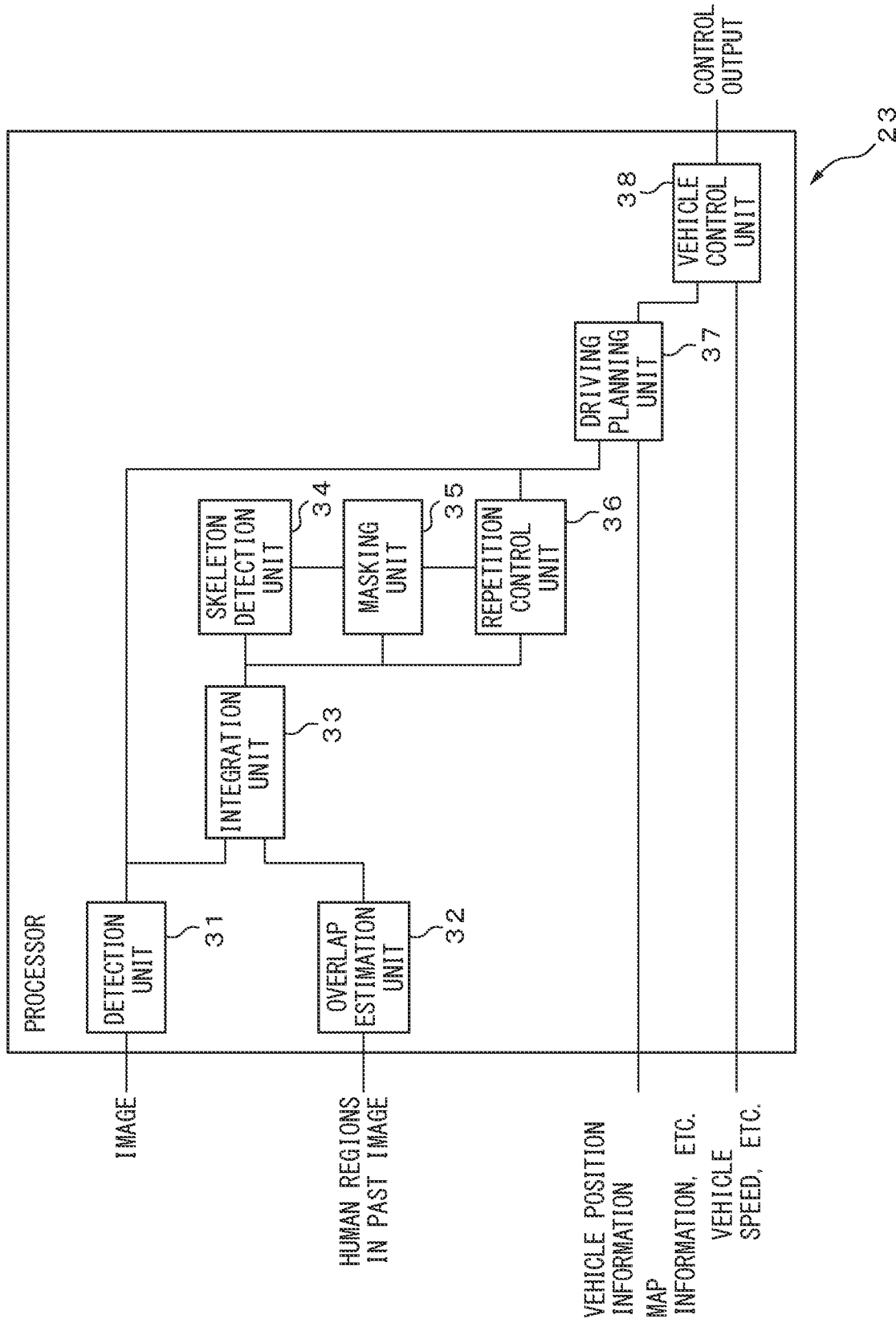
FIG. 3 is a functional block diagram of a processor of the electronic control unit, related to a vehicle control process including a human detection process.

FIG. 3 is a functional block diagram of the processor 23 of the ECU 3, related to the vehicle control process including the human detection process. The processor 23 includes a detection unit 31, an overlap estimation unit 32, an integration unit 33, a skeleton detection unit 34, a masking unit 35, a repetition control unit 36, a driving planning unit 37, and a vehicle control unit 38. These units included in the processor 23 are, for example, functional modules implemented by a computer program executed on the processor 23, or may be dedicated operating circuits provided on the processor 23. Of these units in the processor 23, the detection unit 31, the overlap estimation unit 32, the integration unit 33, the skeleton detection unit 34, the masking unit 35, and the repetition control unit 36 are included in the human detection process. In the case that the vehicle 10 includes multiple cameras, the processor 23 may execute the human detection process for each camera, based on images obtained by the camera.

Whenever receiving an image from the camera 2, the detection unit 31 inputs the latest received image into a classifier for object detection, and thereby detects an object region including a detection target represented in the image and identifies the type of the detection target. In the present embodiment, examples of the detection target include humans. Examples of the detection target may include objects that may affect travel of the vehicle 10, such as other vehicles, traffic lights, road markings, and signposts. An object region including a human is referred to as a human region, as mentioned above.

As the classifier, the detection unit 31 uses a deep neural network (DNN) that has been trained to detect an object region including a detection target represented in an image, identify the type of the detection target. The DNN used by the detection unit 31 may be, for example, a DNN having a convolutional neural network (hereafter simply "CNN") architecture, such as Single Shot MultiBox Detector (SSD) or Faster R-CNN. In this case, the classifier is trained in advance in accordance with a training technique, such as backpropagation, with a large number of training images each representing one of various types of detection targets.

Alternatively, the detection unit 31 may use, as the classifier, a classifier based on a machine learning technique other than a neural network, such as a support vector machine or AdaBoost. In this case, the classifier is trained in advance with a large number of training images like those mentioned above in accordance with a training technique depending on the applied machine learning technique. When such a classifier is used, the detection unit 31 sets windows of various sizes or aspect ratios at various positions in the image. For each window, the detection unit 31 calculates a feature to be inputted into the classifier (e.g., Haar-like feature or HOG feature) from the window, and inputs the calculated feature into the classifier to determine whether a detection target is represented in the window. The detection unit 31 then determines a window determined to represent a certain type of detection target, as an object region. In particular, the detection unit 31 determines a window determined to represent a human, as a human region. Multiple classifiers may be prepared for respective types of detection targets.

The detection unit 31 enters the positions and areas of the detected object regions in the image as well as the types of the objects included in the respective object regions, in a detected-object list. The detection unit 31 stores the detected-object list in the memory 22.

The overlap estimation unit 32 tracks persons detected by the detection unit 31 from each of time-series past images obtained by the camera 2 earlier than the latest image to determine an estimated overlap region in the latest image assumed to represent two or more persons.

For example, the overlap estimation unit 32 applies a tracking process based on optical flow, such as the Lucas-Kanade method, to individual human regions in time-series past images obtained by the camera 2, thereby tracking persons represented in the human regions. To this end, the overlap estimation unit 32 applies, for example, a filter for extracting characteristic points, such as SIFT or Harris operator, to a human region of interest in the latest past image, thereby extracting characteristic points from this human region. The overlap estimation unit 32 then identifies those points in the human regions in the preceding past images which correspond to each of the characteristic points in accordance with the applied tracking technique, thereby calculating the optical flow. Alternatively, the overlap estimation unit 32 may apply another tracking technique applied for tracking a moving object detected from an image to individual human regions in time-series past images, thereby tracking persons represented in the human regions.

For each person being tracked, the overlap estimation unit 32 uses the result of tracking through the time-series past images to predict the position and area of the human region representing the person in the latest image. Specifically, the overlap estimation unit 32 executes a prediction process with, for example, a Kalman filter or a particle filter, on the human regions of a person of interest in the time-series past images to predict the position and area of the human region of this person in the latest image. Alternatively, the overlap estimation unit 32 may extrapolate from the changing positions and areas of the human regions of a person of interest in the time-series past images to predict the position and area of the human region of this person in the latest image.

When the predicted positions and areas of human regions of two or more tracked persons in the latest image at least overlap, the overlap estimation unit 32 sets an estimated overlap region so as to include the two or more overlapping estimated human regions therein. For example, the overlap estimation unit 32 determines a circumscribed rectangular region of the union of the two or more overlapping estimated human regions or a region made by extending the circumscribed rectangular region horizontally or vertically by a predetermined number of pixels as an estimated overlap region. The overlap estimation unit 32 then notifies the position and area of the estimated overlap region to the integration unit 33.

The integration unit 33 integrates two or more human regions overlapping more than a predetermined degree in the latest image obtained by the camera 2 into a single integrated human region. In the present embodiment, the integration unit 33 executes a non-maximum suppression (NMS) process on two or more overlapping human regions to determine whether to integrate the two or more human regions into a single integrated human region.

Specifically, the integration unit 33 calculates the degree of overlap between the two or more overlapping human regions, and compares the calculated degree of overlap with an overlap threshold. As the degree of overlap, the integration unit 33 calculates, for example, the ratio of the area of the overlapping region to that of the whole set of the two or more overlapping human regions, or the intersection over union (IoU). Alternatively, as the degree of overlap, the integration unit 33 may calculate the ratio of the area of the overlapping region to that of the largest of the two or more overlapping human regions. When the degree of overlap is not less than the overlap threshold, the integration unit 33 determines to integrate the two or more human regions into a single integrated human region. In contrast, when the degree of overlap is less than the overlap threshold, the integration unit 33 determines that the two or more human regions represent different persons, and does not integrate these human regions.

The integration unit 33 selects a human region (e.g., the largest object region) from among the two or more human regions determined to be integrated into a single integrated human region as the integrated human region.

The integration unit 33 may set the overlap threshold for the case that the two or more overlapping human regions are inside the estimated overlap region lower than the overlap threshold for the case that these human regions are not inside the estimated overlap region. This results in a relatively large human region being likely to be selected as an integrated human region in an estimated overlap region assumed to represent two or more persons. This increases the possibility that the integrated human region includes two or more persons, enabling the integration unit 33 to prevent failure in detecting some of persons represented on top of another in the image.

According to a modified example, the integration unit 33 may determine the union of the two or more human regions determined to be integrated into a single integrated human region or a circumscribed rectangular region of this union as the integrated human region. Alternatively, when the two or more human regions determined to be integrated into a single integrated human region are inside the estimated overlap region, the integration unit 33 determines the union of these human regions or a circumscribed rectangular region of this union as the integrated human region. In contrast, when the two or more human regions are outside the estimated overlap region, the integration unit 33 may determine one of the two or more human regions as the integrated human region.

Figure 4:
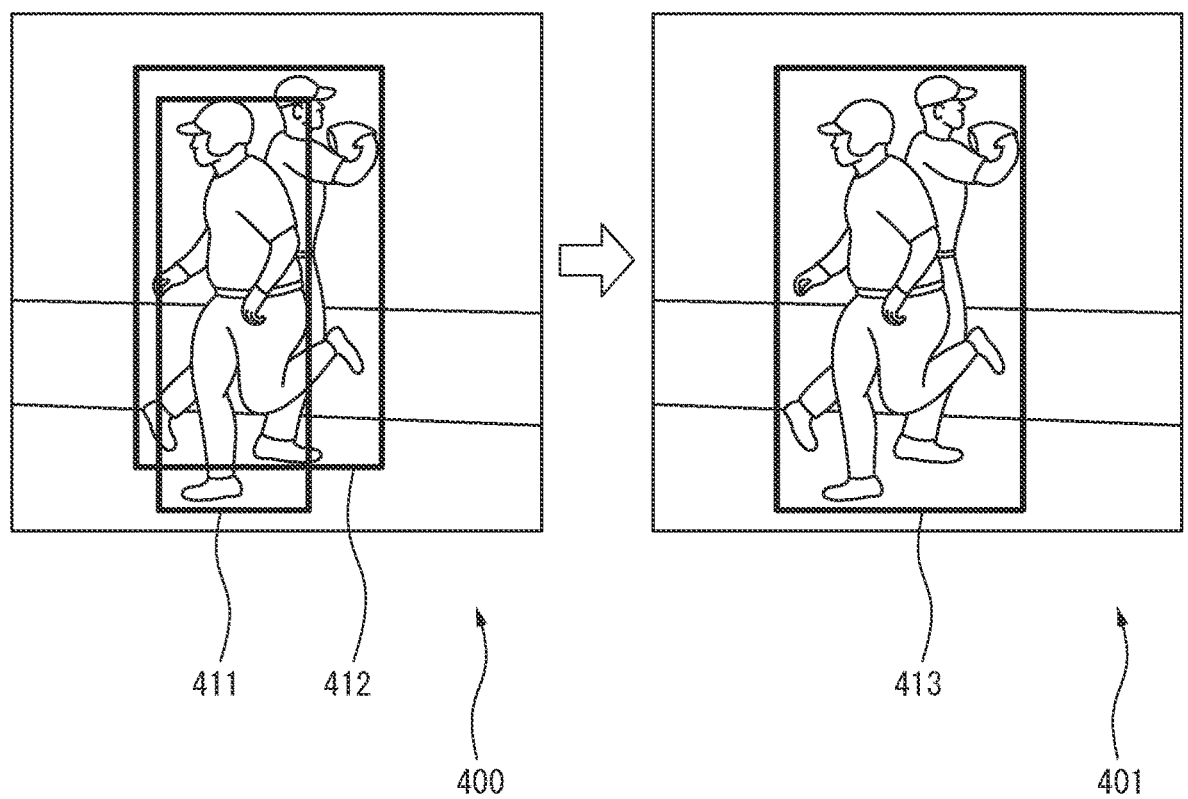
FIG. 4 illustrates an example of an integrated human region.

FIG. 4 illustrates an example of the integrated human region. In an image 400 illustrated on the left of FIG. 4, two overlapping human regions 411 and 412 are detected. In this example, the degree of overlap between the human regions 411 and 412 is not less than the overlap threshold; thus, a single integrated human region 413, which is a circumscribed rectangular region of the union of the human regions 411 and 412, is set, as illustrated in an image 401 on the right.

The integration unit 33 notifies the position and area of the integrated human region to the skeleton detection unit 34.

The skeleton detection unit 34 cuts out the integrated human region from the latest image obtained by the camera 2. The skeleton detection unit 34 then inputs the cutout integrated human region into a skeleton detector that has been trained to detect a human skeleton, thereby detecting a skeleton of an undetermined and foremost person out of one or more persons included in the integrated human region. Whenever a skeleton is detected, the skeleton detection unit 34 increments the number of skeletons detected from the integrated human region by one.

As such a skeleton detector, the skeleton detection unit 34 can use a DNN having a CNN architecture. The skeleton detector is trained in advance in accordance with a training technique, such as backpropagation, with a large number of training images representing human skeletons. The skeleton detector outputs the positions of reference points for determining a skeleton, such as the head, neck, shoulders, elbows, hands, hip joints, knees, and feet, and skeletal lines representing the connection relationship between the reference points according to the structure of a human body. Specifically, for each pixel in the integrated human region, the skeleton detector calculates confidence scores indicating how likely respective types of reference points (e.g., the head and neck) are represented, and outputs a position at which one of the confidence scores is not less than a predetermined threshold as a reference point of the corresponding type. The skeleton detector then selects each type of reference point from among the detected reference points so as to maximize the degree of reliability of the selected reference points connected according to the structure of a human body, and thereby can detect the skeleton of the foremost one of undetermined persons from the integrated human region.

The skeleton detection unit 34 notifies the repetition control unit 36 of the result of determination whether a skeleton is detected. When a skeleton is detected, the skeleton detection unit 34 further notifies the masking unit 35 of skeleton information indicating the positions of the reference points and the skeletal lines of the detected skeleton.

The masking unit 35 modifies the integrated human region by masking a region representing the newly detected foremost person in the integrated human region, based on the skeleton information received from the skeleton detection unit 34, i.e., the skeletal lines of the foremost person. In the present embodiment, the masking unit 35 determines a region not farther than a predetermined distance from a skeletal line as a mask region. Since the trunk of a human is thicker than the arms and the legs, the masking unit 35 may set the predetermined distance from a skeletal line corresponding to the trunk greater than that from a skeletal line corresponding to the arm or the leg. Additionally, since a smaller integrated human region is assumed to represent a human farther from the camera 2, the masking unit 35 may decrease the predetermined distance from a skeletal line with the size of the integrated human region. Alternatively, the masking unit 35 may decrease the predetermined distance from a skeletal line with the distance between the reference points corresponding to the head and the foot.

The masking unit 35 masks the mask region by substituting the values of pixels included in the mask region with a constant value or with values such that the mask region will be a predetermined pattern or random noise. This results in no reference point of a skeleton being detected from the mask region. The masking unit 35 passes the integrated human region modified by masking the mask region to the skeleton detection unit 34.

The repetition control unit 36 causes the skeleton detection unit 34 and the masking unit 35 to repeat processes until a human skeleton is no longer detected from the integrated human region. In the present embodiment, when receiving, from the skeleton detection unit 34, the result of determination indicating that a skeleton is detected, the repetition control unit 36 causes the masking unit 35 to mask a region representing the detected person in the integrated human region, thereby modifying the integrated human region. The repetition control unit 36 then causes the skeleton detection unit 34 to execute the skeleton detection process again on the modified integrated human region outputted from the masking unit 35. In contrast, when receiving, from the skeleton detection unit 34, the result of determination indicating that no skeleton is detected, the repetition control unit 36 determines the number of skeletons detected from the integrated human region and counted by the skeleton detection unit 34 up to this time as the number of persons included in the integrated human region. The repetition control unit 36 then associates this number of persons represented in the integrated human region with those, of the persons being tracked, in human regions in the latest image whose estimated positions at least overlap the integrated human region, enabling continuous tracking of these persons.

Figure 5:
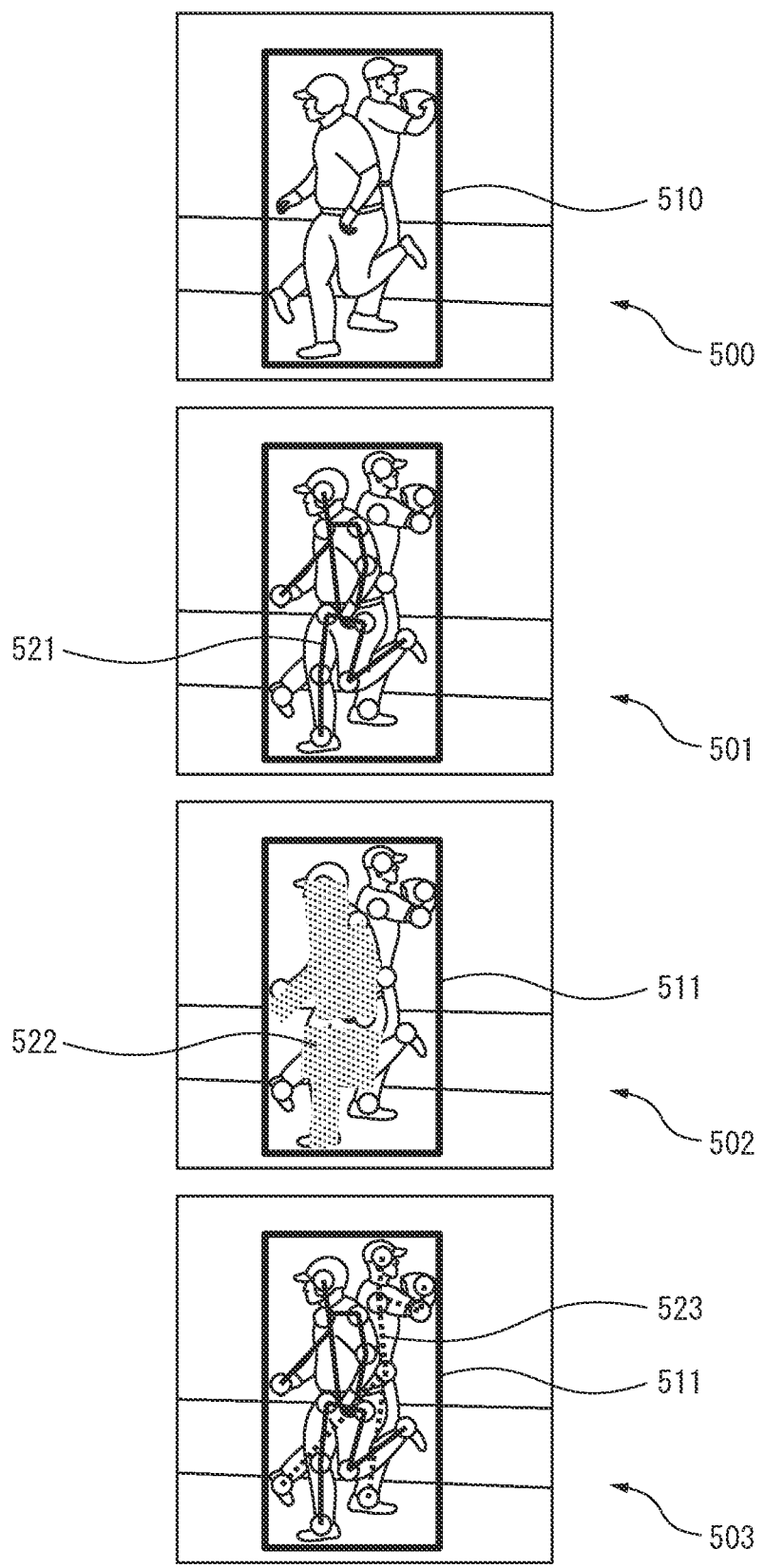
FIG. 5 illustrates an example of a skeleton detection process and a masking process.

FIG. 5 illustrates an example of the skeleton detection process and the masking process. The first execution of the skeleton detection process by the skeleton detection unit 34 on an integrated human region 510 in the uppermost image 500 leads to detection of a skeleton 521 of a first person, as illustrated in the second image 501 from the top. Then, execution of the masking process by the masking unit 35 yields an integrated human region 511 in which a mask region 522 centered at the skeleton 521 is masked, as illustrated the third image 502 from the top. The second execution of the skeleton detection process on the integrated human region 511 leads to detection of a skeleton 523 of a second person from the integrated human region 511, as illustrated in the fourth image 503 from the top. In this way, alternate execution of the skeleton detection process and the masking process leads to sequential detection of all the human skeletons included in the integrated human region.

Figure 6:
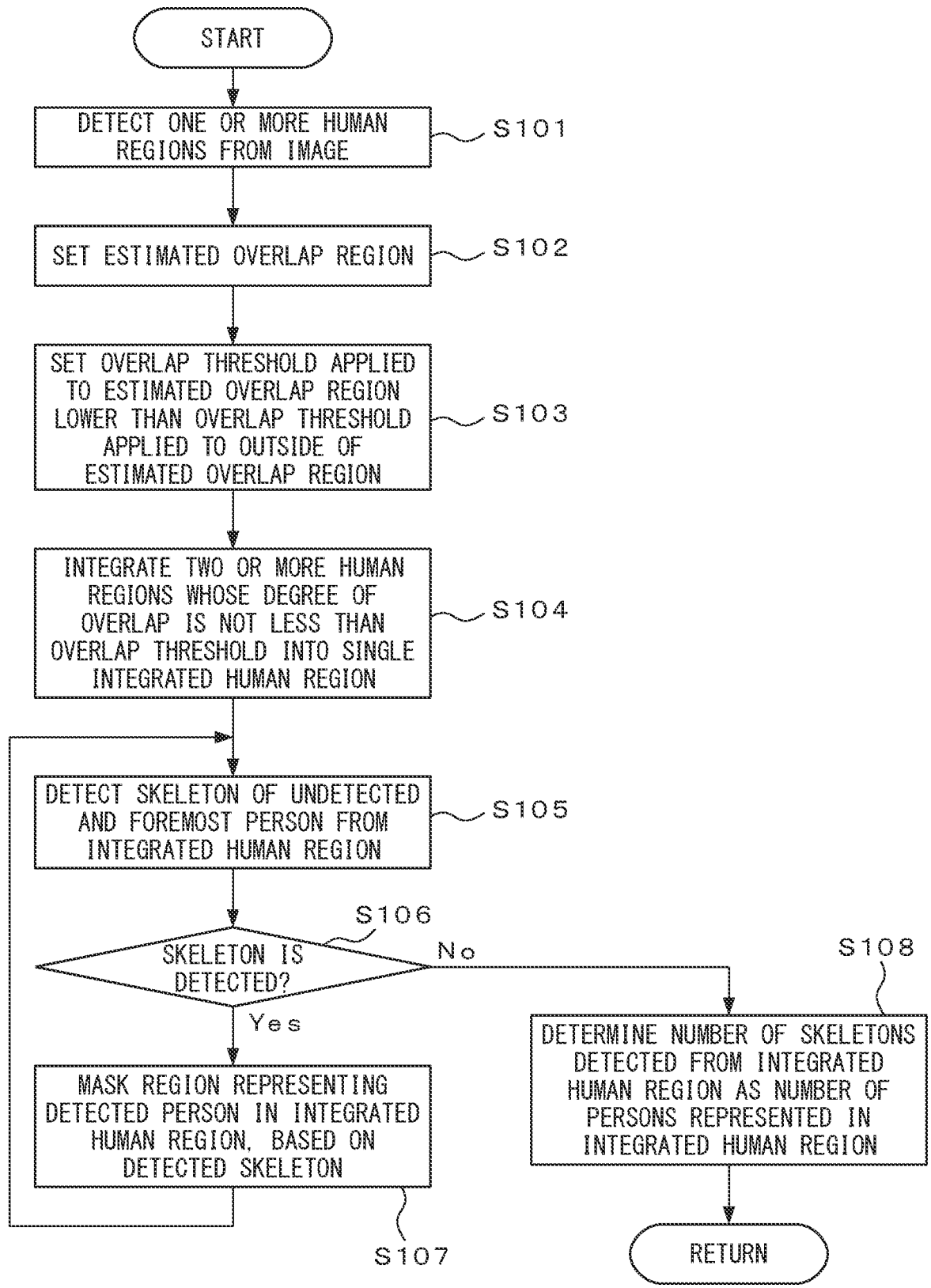
FIG. 6 is an operation flowchart of the human detection process.

FIG. 6 is an operation flowchart of the human detection process executed by the processor 23. Whenever receiving an image from the camera 2, the processor 23 executes the human detection process in accordance with the operation flowchart illustrated in FIG. 6.

The detection unit 31 of the processor 23 inputs an image obtained from the camera 2 into a classifier to detect one or more persons represented in the image. In other words, the detection unit 31 detects one or more human regions including a human in the image (step S101).

The overlap estimation unit 32 of the processor 23 sets an estimated overlap region so as to include two or more predicted human regions at least overlapping in the latest image, based on human regions of individual tracked persons in time-series past images (step S102).

The integration unit 33 of the processor 23 sets the overlap threshold applied to the estimated overlap region lower than the overlap threshold applied to the outside of the estimated overlap region (step S103). The integration unit 33 then integrates two or more overlapping human regions whose degree of overlap is not less than the overlap threshold into a single integrated human region (step S104).

The skeleton detection unit 34 of the processor 23 inputs the integrated human region into a skeleton detector to detect a skeleton of an undetected and foremost person (step S105).

The repetition control unit 36 of the processor 23 determines whether a skeleton is detected in step S105 (step S106). When a skeleton is detected (Yes in step S106), the repetition control unit 36 causes the masking unit 35 of the processor 23 to mask a region representing the detected person in the integrated human region, based on the detected skeleton (step S107). The repetition control unit 36 then causes the process of step S105 and the subsequent steps to be executed again on the integrated human region in which the region representing the detected person is masked.

When no skeleton is detected (No in step S106), the repetition control unit 36 determines the number of skeletons detected from the integrated human region up to this time as the number of persons included in the integrated human region (step S108). The processor 23 then terminates the human detection process.

The driving planning unit 37 generates one or more planned trajectories of the vehicle 10 in a predetermined section from the current position of the vehicle 10 to a predetermined distance (e.g., 500 m to 1 km) away by referring to the detected-object list so that the vehicle 10 will not collide with any of objects around the vehicle 10. Each planned trajectory is represented, for example, as a set of target positions of the vehicle 10 at respective times during travel of the vehicle 10 through the predetermined section.

To generate a planned trajectory, the driving planning unit 37 tracks the detection targets entered in the detected-object list (the detection targets include a human and will be simply referred to as objects), and predicts trajectories of the tracked objects in a period from the current time until a predetermined time ahead.

For example, the driving planning unit 37 applies a tracking process similar to that described in relation to the overlap estimation unit 32 to an object region of interest in the latest image and object regions in past images obtained by the camera 2, thereby tracking the object represented in these object regions.

For each object being tracked, the driving planning unit 37 executes viewpoint transformation, using information such as the position at which the camera 2 is mounted on the vehicle 10, thereby transforming the image coordinates of the object into coordinates in an aerial image ("aerial-image coordinates"). To this end, the driving planning unit 37 can estimate the position of the detected object at the time of acquisition of each image, using the position and orientation of the vehicle 10, an estimated distance to the detected object, and the direction from the vehicle 10 to the object at the time of acquisition of each image. The driving planning unit 37 can estimate the position and orientation of the vehicle 10 at the time of acquisition of each image, based on, for example, information indicating the current position of the vehicle 10 obtained from the GPS receiver (not illustrated) mounted on the vehicle 10. Alternatively, whenever an image is obtained by the camera 2, the driving planning unit 37 may detect lane-dividing lines on the right and left of the vehicle 10 from the image, and compare the detected lane-dividing lines with map information stored in the memory 22, thereby estimating the position and orientation of the vehicle 10. The driving planning unit 37 can identify the direction from the vehicle 10 to the detected object, based on the position of the object region including the object in the image and the direction of the optical axis of the camera 2. Additionally, the bottom position of an object region is assumed to correspond to the position at which the object represented in this object region is in contact with the road surface. Thus the driving planning unit 37 can estimate the distance to the object represented in the object region, based on the direction from the camera 2 corresponding to the bottom of the object region and the height of the mounted position of the camera 2. The driving planning unit 37 can estimate the predicted trajectory of the object to a predetermined time ahead by executing a prediction process with, for example, a Kalman filter or a particle filter, on time-series aerial-image coordinates in a preceding predetermined period.

The driving planning unit 37 sets a planned trajectory of the vehicle 10, based on the predicted trajectories of the objects being tracked, so that a predicted distance between the vehicle 10 and any of the tracked objects will be not less than a predetermined distance until the predetermined time ahead and that the planned trajectory will follow a planned travel route to a destination. To this end, the driving planning unit 37 calculates the inverse of the sum of the distances to tracked objects closest to positions on the planned trajectory at respective times until the predetermined time ahead, as an evaluation function. The driving planning unit 37 then sets a planned trajectory in accordance with a predetermined optimization technique, such as dynamic programming or the steepest-descent method, so as to minimize the evaluation function.

The driving planning unit 37 may generate multiple planned trajectories. In this case, the driving planning unit 37 may select one of the planned trajectories such that the sum of the absolute values of acceleration of the vehicle 10 will be the smallest.

The driving planning unit 37 notifies the generated planned trajectory to the vehicle control unit 38.

The vehicle control unit 38 controls components of the vehicle 10 so that the vehicle 10 will travel along the received planned trajectory. For example, the vehicle control unit 38 determines target acceleration of the vehicle 10 according to the received planned trajectory and the current speed of the vehicle 10 measured by a vehicle speed sensor (not illustrated), and sets the degree of accelerator opening or the amount of braking so that the acceleration of the vehicle 10 will be equal to the target acceleration. The vehicle control unit 38 then determines the amount of fuel injection according to the set degree of accelerator opening, and outputs a control signal depending on the amount of fuel injection to a fuel injector of the engine of the vehicle 10. Alternatively, the vehicle control unit 38 outputs a control signal depending on the set amount of braking to the brake of the vehicle 10.

When changing the direction of the vehicle 10 in order for the vehicle 10 to travel along the planned trajectory, the vehicle control unit 38 determines the steering angle of the vehicle 10 according to the planned trajectory and outputs a control signal depending on the steering angle to an actuator (not illustrated) that controls the steering wheel of the vehicle 10.

Figure 7:
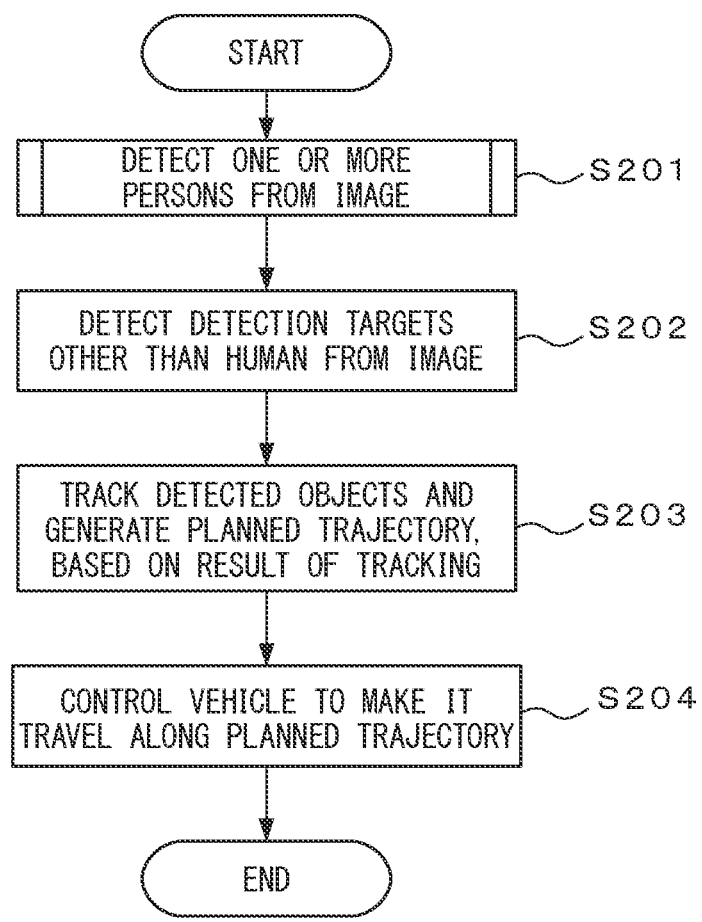
FIG. 7 is an operation flowchart of the vehicle control process including the human detection process.

FIG. 7 is an operation flowchart of the vehicle control process including the human detection process and executed by the processor 23. Whenever receiving an image from the camera 2, the processor 23 executes the vehicle control process in accordance with the operation flowchart illustrated in FIG. 7.

The processor 23 detects one or more persons from an image obtained from the camera 2 in accordance with the operation flowchart illustrated in FIG. 6 (step S201). Additionally, the detection unit 31 of the processor 23 detects detection targets other than a human from the image (step S202).

The driving planning unit 37 of the processor 23 tracks the detection targets to estimate predicted trajectories of these objects. The driving planning unit 37 then generates a planned trajectory of the vehicle 10 so that it will be separated more than a predetermined distance from any of the estimated predicted trajectories (step S203). The vehicle control unit 38 of the processor 23 controls the vehicle 10 so that it will travel along the planned trajectory (step S204). The processor 23 then terminates the vehicle control process.

As has been described above, the apparatus for human detection integrates two or more of human regions detected from an image and overlapping more than a predetermined degree into a single integrated human region. The apparatus then inputs the integrated human region into a skeleton detector that has been trained to detect a human skeleton, thereby determining a skeleton of an undetermined and foremost person out of one or more persons included in the integrated human region. Additionally, the apparatus masks a region representing the foremost person in the integrated human region, based on the skeleton of the foremost person, and inputs the integrated human region, which is modified by masking, into the skeleton detector again. After that, the apparatus repeats the skeleton detection process and the masking process until a human skeleton is no longer detected from the integrated human region. This enables the apparatus to detect individual persons even if they overlap in the image.

According to a modified example, when two or more overlapping human regions whose degree of overlap is not less than the overlap threshold are outside the estimated overlap region, the integration unit 33 may determine that the two or more human regions represent the same person. The integration unit 33 may then select only one of the two or more human regions and delete the other human regions from the detected-object list. In this case, the skeleton detection unit 34, the masking unit 35, and the repetition control unit 36 may omit to execute their processes on these two or more human regions. This will result in the apparatus repeating the skeleton detection process and the masking process only for a region assumed to represent overlapping persons from the result of tracking through past images. For this reason, the apparatus can prevent a single person from being erroneously detected as multiple persons even when multiple human regions are detected for the same person. In this modified example, when two or more human regions whose degree of overlap is not less than the overlap threshold are inside the estimated overlap region, the integration unit 33 may set the integrated human region so as to include the union of the two or more human regions therein, as described in the embodiment. This enables the apparatus to set the integrated human region appropriately, based on whether two or more human regions whose degree of overlap is not less than the overlap threshold are inside the estimated overlap region. For this reason, the apparatus can prevent a single person from being erroneously detected as multiple persons and correctly detect multiple persons represented on top of another in an image.

The apparatus for human detection according to the embodiment or modified examples may be mounted on a device other than vehicle-mounted equipment. For example, the apparatus according to the embodiment or modified examples may be configured to detect a human from an image generated by a surveillance camera placed for taking pictures of a predetermined outdoor or indoor region at predetermined intervals. When a human is detected for a certain period, the apparatus may cause a message indicating detection of a human to appear on a display connected to the apparatus.

A computer program for achieving the functions of the units of the processor 23 of the apparatus for human detection according to the embodiment or modified examples may be provided in a form recorded on a computer-readable and portable medium, such as a semiconductor memory, a magnetic recording medium, or an optical recording medium.

As described above, those skilled in the art may make various modifications according to embodiments within the scope of the present invention.

What is claimed is:

1. An apparatus for human detection, comprising:
a processor configured to:
detect human regions representing a human from an image generated by a camera,
set a single integrated human region by selecting one of two or more human regions whose degree of overlap is not less than a predetermined threshold among the detected human regions or by defining a region including the two or more human regions,
input the integrated human region into a skeleton detector to detect a skeleton of an undetermined and foremost person out of one or more persons included in the integrated human region, the skeleton detector having been trained to detect a human skeleton,
mask a region representing the foremost person in the integrated human region based on the skeleton of the foremost person to modify the integrated human region,
repeat detection of a skeleton and masking of a region representing a person in the modified integrated human region until a human skeleton is no longer detected, and
determine the number of skeletons detected from the integrated human region as the number of persons represented in the integrated human region,
wherein the region representing the foremost person in the integrated human region is masked by substituting a value of pixels included in the region with a constant value or with a value of pixels such that the mask region is a predetermined pattern or random noise.

2. The apparatus according to claim 1, wherein the processor is further configured to track persons detected from each of time-series past images generated by the camera earlier than the image to determine an estimated overlap region in the image assumed to represent two or more persons, wherein
when the two or more human regions whose degree of overlap is not less than the threshold are outside the estimated overlap region, the processor determines that the two or more human regions represent the same person.

3. The apparatus according to claim 2, wherein when the two or more human regions whose degree of overlap is not less than the threshold are outside the estimated overlap region, the processor selects one of the two or more human regions and deletes the other human regions; and when the two or more human regions whose degree of overlap is not less than the threshold are inside the estimated overlap region, the processor sets the integrated human region so as to include the union of the two or more human regions therein.

4. The apparatus according to claim 1, wherein the processor is further configured to track persons detected from each of time-series past images generated by the camera earlier than the image to determine an estimated overlap region in the image assumed to represent two or more persons, wherein
the processor sets the threshold for the case that the two or more human regions are inside the estimated overlap region lower than the threshold for the case that the two or more human regions are outside the estimated overlap region.

5. A method for human detection, comprising:
detecting human regions representing a human from an image generated by a camera;
setting a single integrated human region by selecting one of two or more human regions whose degree of overlap is not less than a predetermined threshold among the detected human regions or by defining a region including the two or more human regions;
inputting the integrated human region into a skeleton detector to detect a skeleton of an undetermined and foremost person out of one or more persons included in the integrated human region, the skeleton detector having been trained to detect a human skeleton;
masking a region representing the foremost person in the integrated human region based on the skeleton of the foremost person to modify the integrated human region;
repeating detection of a skeleton and masking of a region representing a person in the modified integrated human region until a human skeleton is no longer detected; and
determining the number of skeletons detected from the integrated human region as the number of persons represented in the integrated human region
wherein the masking the region representing the foremost person in the integrated human region comprises substituting a value of pixels included in the region with a constant value or with a value of pixels such that the mask region is a predetermined pattern or random noise.

6. A non-transitory recording medium that stores a computer program for human detection, the computer program causing a computer to execute a process comprising:
detecting human regions representing a human from an image generated by an image capturing unit;
setting a single integrated human region by selecting one of two or more human regions whose degree of overlap is not less than a predetermined threshold among the detected human regions or by defining a region including the two or more human regions;
inputting the integrated human region into a skeleton detector to detect a skeleton of an undetermined and foremost person out of one or more persons included in the integrated human region, the skeleton detector having been trained to detect a human skeleton;
masking a region representing the foremost person in the integrated human region based on the skeleton of the foremost person to modify the integrated human region;
repeating detection of a skeleton and masking of a region representing a person in the modified integrated human region until a human skeleton is no longer detected; and
determining the number of skeletons detected from the integrated human region as the number of persons represented in the integrated human region,
wherein the masking the region representing the foremost person in the integrated human region comprises substituting a value of pixels included in the region with a constant value or with a value of pixels such that the mask region is a predetermined pattern or random noise.

* * * * *